No. 896,629. PATENTED AUG. 18, 1908.
J. DE VERE & J. WHITEHEAD.
WHEEL FOR VEHICLES.
APPLICATION FILED JULY 5, 1907.

Witnesses:

Inventors
John De Vere
Joseph Whitehead
By James L. Norris
Atty.

UNITED STATES PATENT OFFICE.

JOHN DE VERE, OF BLACKBURN, AND JOSEPH WHITEHEAD, OF CLITHEROE, ENGLAND.

WHEEL FOR VEHICLES.

No. 896,629.  Specification of Letters Patent.  Patented Aug. 18, 1908.

Application filed July 5, 1907. Serial No. 382,344.

*To all whom it may concern:*

Be it known that we, JOHN DE VERE and JOSEPH WHITEHEAD, subjects of the King of Great Britain, residents, respectively, of 29 Cromwell Terrace, Blackburn, England, and 29 Castle View, Clitheroe, England, have invented certain new and useful Improvements in or Relating to the Construction of Wheels for Vehicles, Motor-Cars, and the Like, of which the following is a specification.

The invention appertains to wheels for vehicles.

Figure 1:
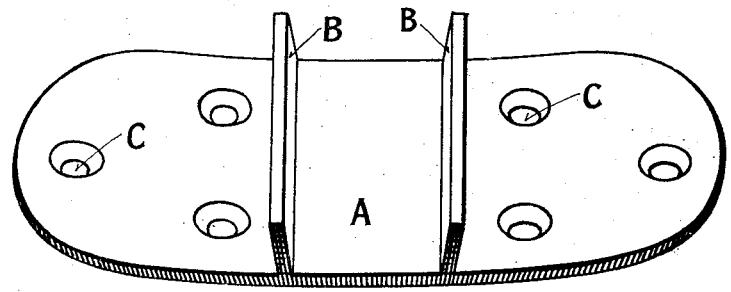
Figure 4:
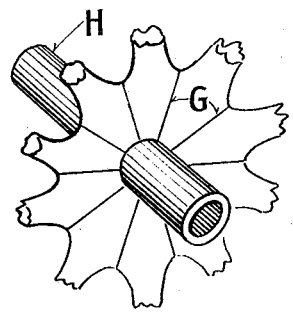
Figure 2:
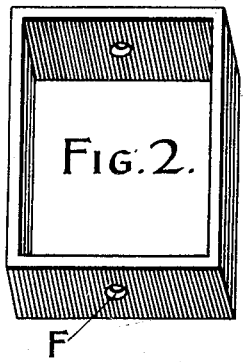
Figure 5:
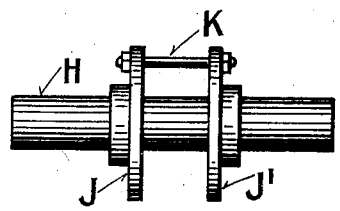
Figure 3:
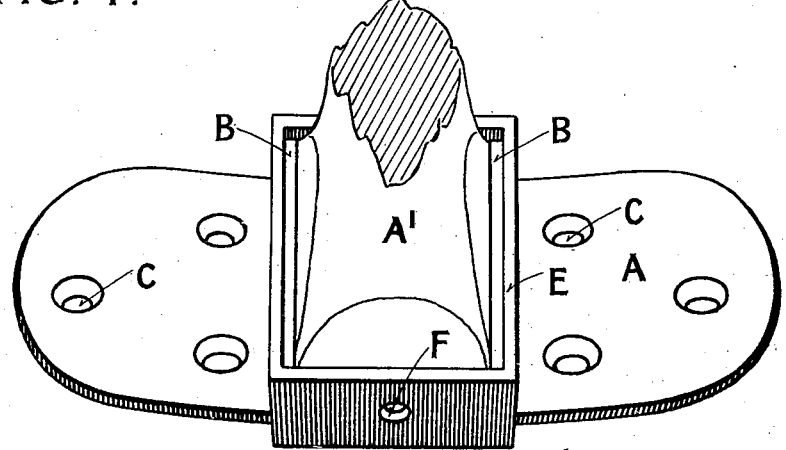

One form of embodiment of said invention is shown in the accompanying drawings, referring to which, Figure 1 is a perspective view of a fastening plate. Fig. 2 is a similar view of a sleeve. Fig. 3 is a like view of said plate and sleeve in coöperative relation, a portion of the spoke also appearing in said figure. Fig. 4 is a perspective view of the central portion of the wheel without the two disks thereon. Fig. 5 is an elevation of the axle and the disks, showing also a bolt for connecting said disks.

Like characters refer to like parts throughout the several figures.

The invention is designed chiefly to provide means for detachably securing the spokes to the rims or fellies without the usual tenon joints, and without weakening to any appreciable extent the spokes, or the material of which the fellies or rim are composed.

While permitting of quick detachability for the renewal or replacement of parts in case of damage, our invention insures a perfectly rigid and safe joint to be made.

To enable the liberation of a spoke from the hub prior to its removal from the wheel, we employ a hub in the form of a metal tube, and having an integral flange or disk on one side, and on the other a loose flange or disk provided with a central hole large enough to enable it to be slipped over the tubular portion of the hub. Into the space between the fixed and loose disks are inserted the ends of the spokes. These ends are formed with shoulders cut to the segment of a circle, so that when the shoulders are introduced into the space between the fixed and loose disks, they will form a solid circular series, and may then be clamped together by bolts passed through holes in the respective faces of the disks, and having nuts tightened on their extremities. Or, the loose disk may be screwed on the tube, and fixed to the spokes by screws.

The above method forms a good and ready means of detachably fixing the spokes to the hub, although any other usual or approved method may be adopted. Any ordinary axle-box, oil cup and fittings to take up or relieve wear incidental to the revolving of the wheel on the arm of the axle may be adopted, and the wheel may be prevented from leaving the latter by means of a collar, linch-pin, axle-nut, or the like in any ordinary or suitable manner.

Briefly and broadly speaking, our invention may be stated to comprise attachments in the shape of brackets or projections fixed to the inner face of the rim or fellies at required intervals around it for the spokes, and projecting therefrom towards the axis of the wheel in combination with a loose or movable sleeve arranged to slide on the end of the spoke, so that when the end of the latter is brought into position opposite the said projection or projections, the said sleeve may be passed over the said projection or projections and the end of the spoke respectively, thereby firmly securing and locking the spoke to the rim. The sleeve is then retained in position by a screw, pin, bolt, or the like. The above forms a perfectly rigid and secure method of attachment free from any objections attendant upon other methods that have been previously adopted or tried for a like purpose. Two of such brackets or projections are preferably employed for the attachment of each spoke, and are L shaped and set at such a distance apart from each other, as to permit of the passage sidewise of the end of the spoke into the intervening space between their projecting members. The limbs of the bracket adjacent to the inner face of the rim are riveted or fixed by screws to it or to the fellies.

The end of the spoke and the loose movable sleeve are formed square, so as to enable a spoke to be introduced or removed from the side and to also provide for the non-rotative fit of said sleeve around projections on the plate or body of the device. When the end of the spoke has been got into position, the loose movable sleeve (already on the spoke) is slipped over the brackets, so as to lock the end of the spoke between them.

The sleeve is then retained in position by a small screw driven through it into the end of the spoke.

In the application of our invention, one of the following methods may be adopted:—

First, the brackets for fixing the spokes may be secured directly to a hollow rim having the usual side grooves for fixing a solid, cushion or pneumatic tire. This construction will be very useful for application to motor-cars and light carriages, where speed, durability and resiliency, combined with lightness and strength, are essential requirements.

Secondly, the brackets may be secured in the manner described to an inner rim having a channel, square in cross-section, to receive the usual wood fellies, which may be secured thereto by screws passed through the outer edges or sides of the channel, and upon which may be fixed a plain metal rim, or a hollow rim may be fixed and fitted with a solid cushion or pneumatic tire.

Thirdly, the brackets may be secured directly to the fellies by screws driven through the brackets into the bottom of the fellies, and an outer rim of any suitable construction may be employed as described, and furnished with a tire or otherwise.

Instead of employing a pair of loose angular L shaped brackets as heretofore described, we may employ a plate formed with a pair of vertical ribs or projections, between which the end of the spoke is brought prior to the sleeve being slipped over them.

The method of attachment is represented in Figs. 1, 2 and 3 of the annexed drawings, wherein Fig. 1 shows such a plate A cast with a pair of vertical ribs or projections B B. The said plate is curved to conform to the circumference of the under face of the rim, and is provided with holes C, through which, screws nails or rivets may be driven into the underface of the rim or felly, thereby securely fixing the same thereto. The plate may be formed with side flanges to embrace the sides of the rim, if desired, thereby preventing any side play when the plates have been fixed in position. The number of such plates corresponds to the number of the spokes it is desired to fit to the wheel. The end of the spoke A' fits into the space between the projections B B. The loose sleeve E is mounted loosely on the spoke, and when the end of the latter has been got into position between the projections B B, the loose sleeve is brought over the latter as represented in Fig. 3, thereby firmly attaching the spoke to the rim. The edge E' of the sleeve overlaps the edge of the plate. When the sleeve has been got into position, it is retained by a small screw driven through the hole F into the side of the spoke. The other ends of the spoke may be secured to the hub of the wheel in any suitable or approved manner, so long as provision is made for their quick removal, and the hub may likewise be of any desired type.

As seen in Fig. 4, the opposite ends of the spokes are formed with shoulders G cut to the segment of a circle, so that when they are placed around the tubular portion H of the hub, they will present a solid structure as shown. The hub is provided with a fixed disk or face plate J and a similar but loose disk or face plate J', which is brought against the solid structure formed by the ends of the spokes when fitted in place as shown in Fig. 4, and is then secured by bolts K passed through holes in the disks and through the solid ends of the spokes, the parts being thus clamped together by nuts tightened on the extremities of the bolts.

Having now particularly described and ascertained the nature of our said invention, and in what manner the same is to be performed, we declare that what we claim is:—

1. The combination of a longitudinally curved perforated plate having two parallel transversely extending projections, a spoke fitted between said projections, and a non-rotative sleeve inclosing the projections and also bridging the spaces between the ends of said projections.

2. The combination of a plate having two parallel transversely extending projections, a spoke having a square portion fitted between said projections, and a square sleeve inclosing the projections and bridging the spaces between the ends of the same.

In testimony whereof we have hereunto set our hand in presence of two subscribing witnesses.

JOHN DE VERE.
JOSEPH WHITEHEAD.

Witnesses:
   Ernald Simpson Moseley,
   Malcolm Smethurst.